May 23, 1933.　　H. G. BARTHOLOMEW ET AL　　1,910,586
TELAUTOGRAPHY OR PHOTOTELEGRAPHY
Filed July 9, 1929　　7 Sheets-Sheet 1
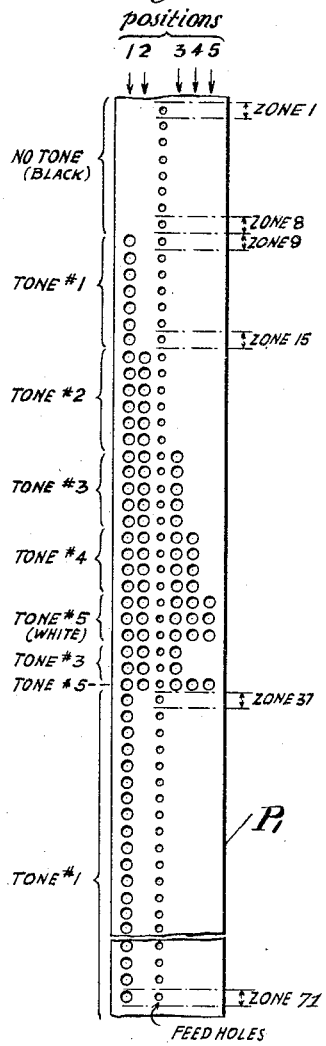
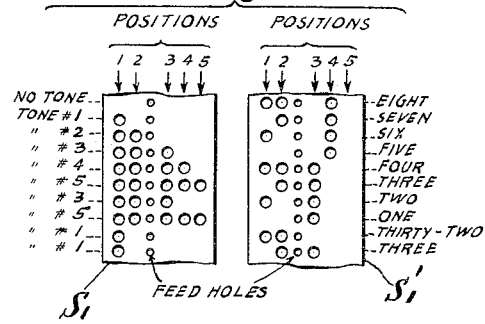
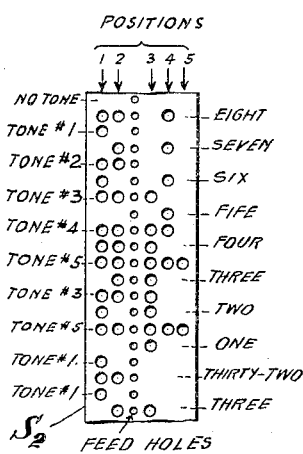
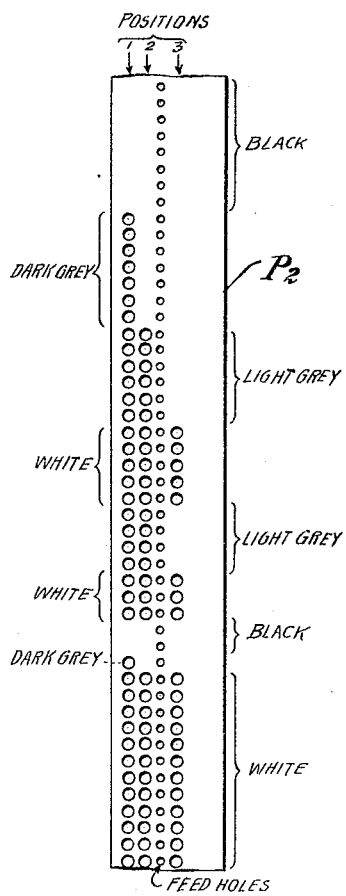
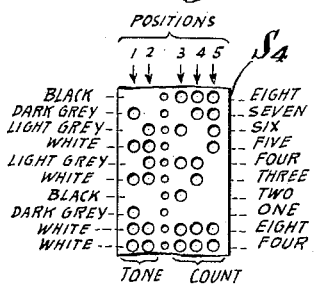
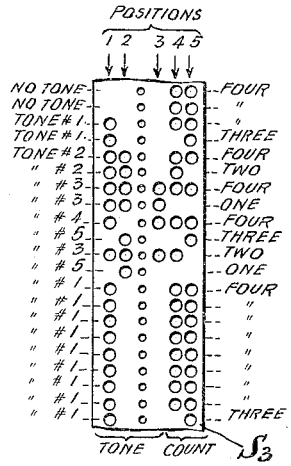
INVENTORS
Harry Guy Bartholomew
Maynard Leslie Deeds McFarlane
BY George Rawsey
their ATTORNEY

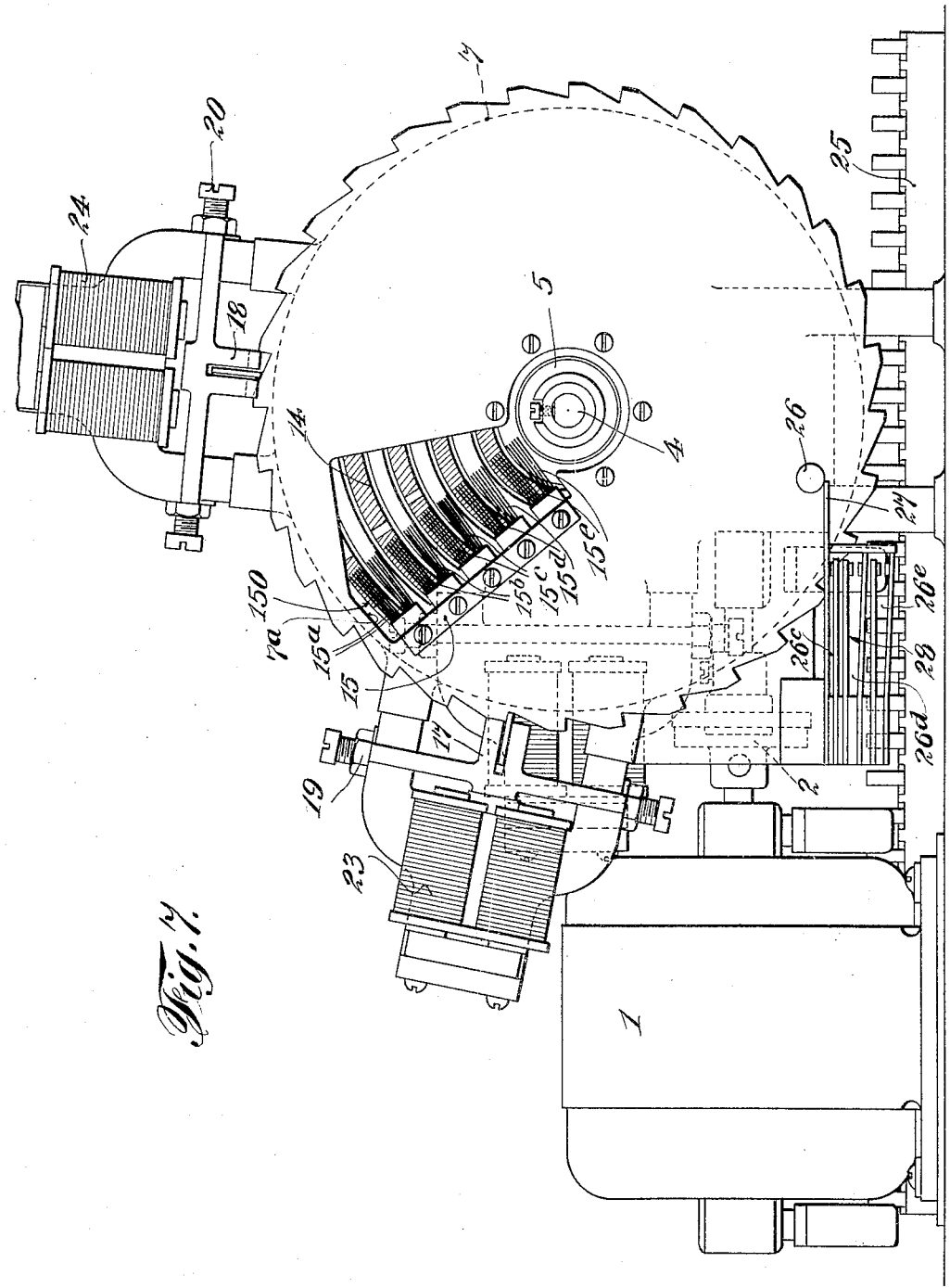

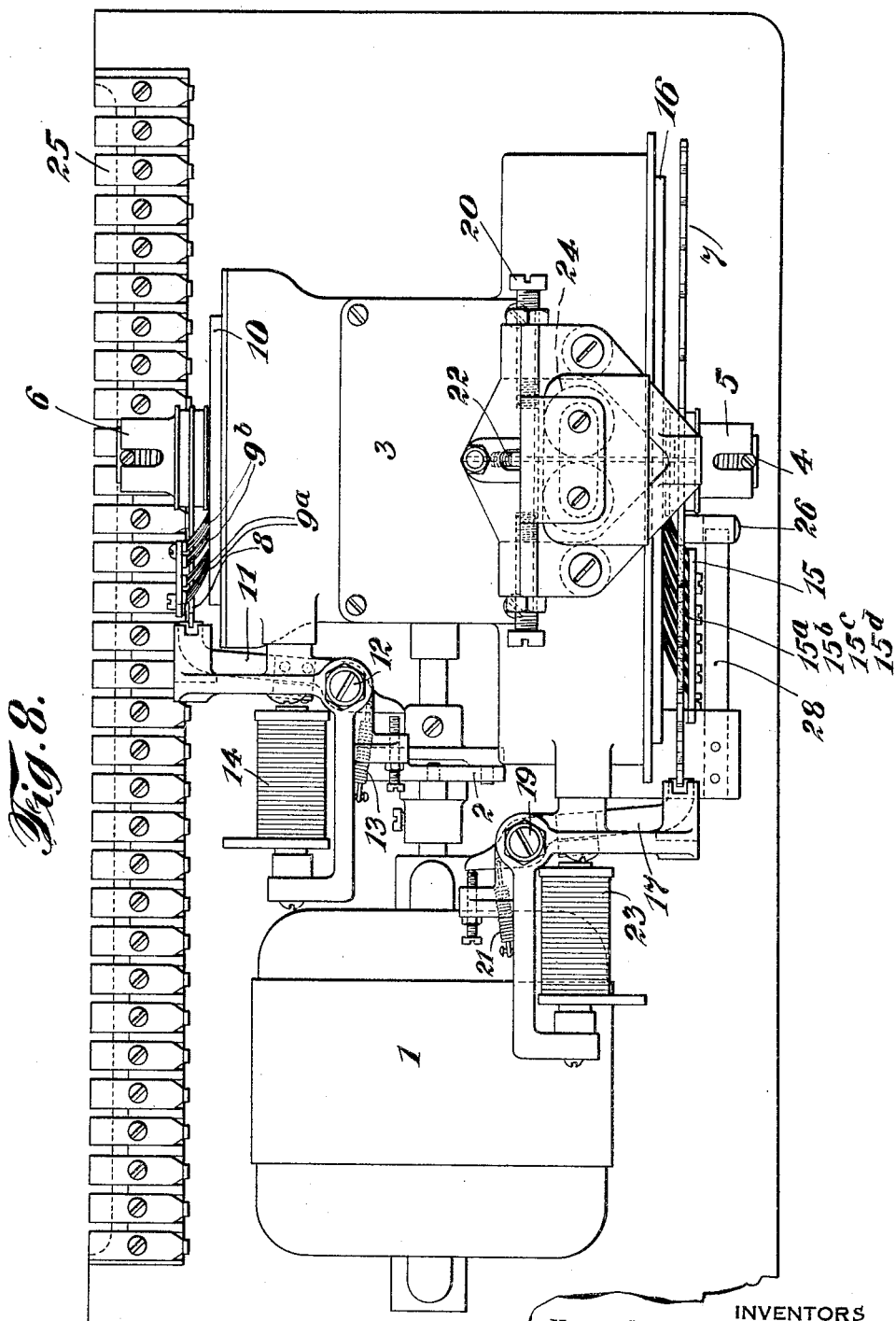

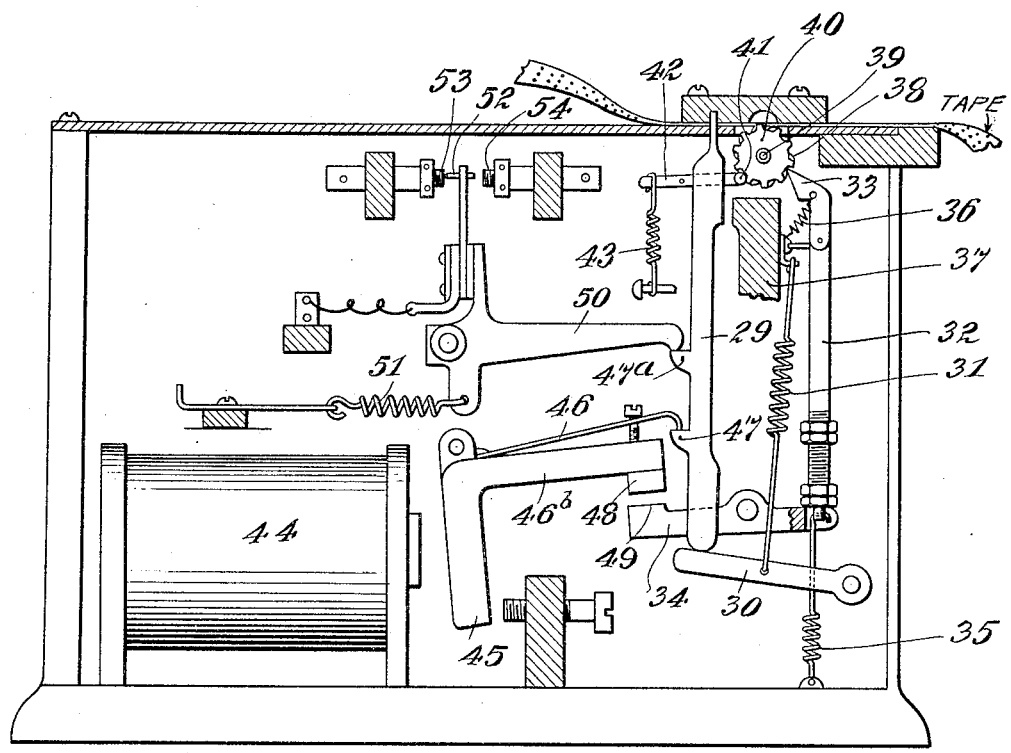

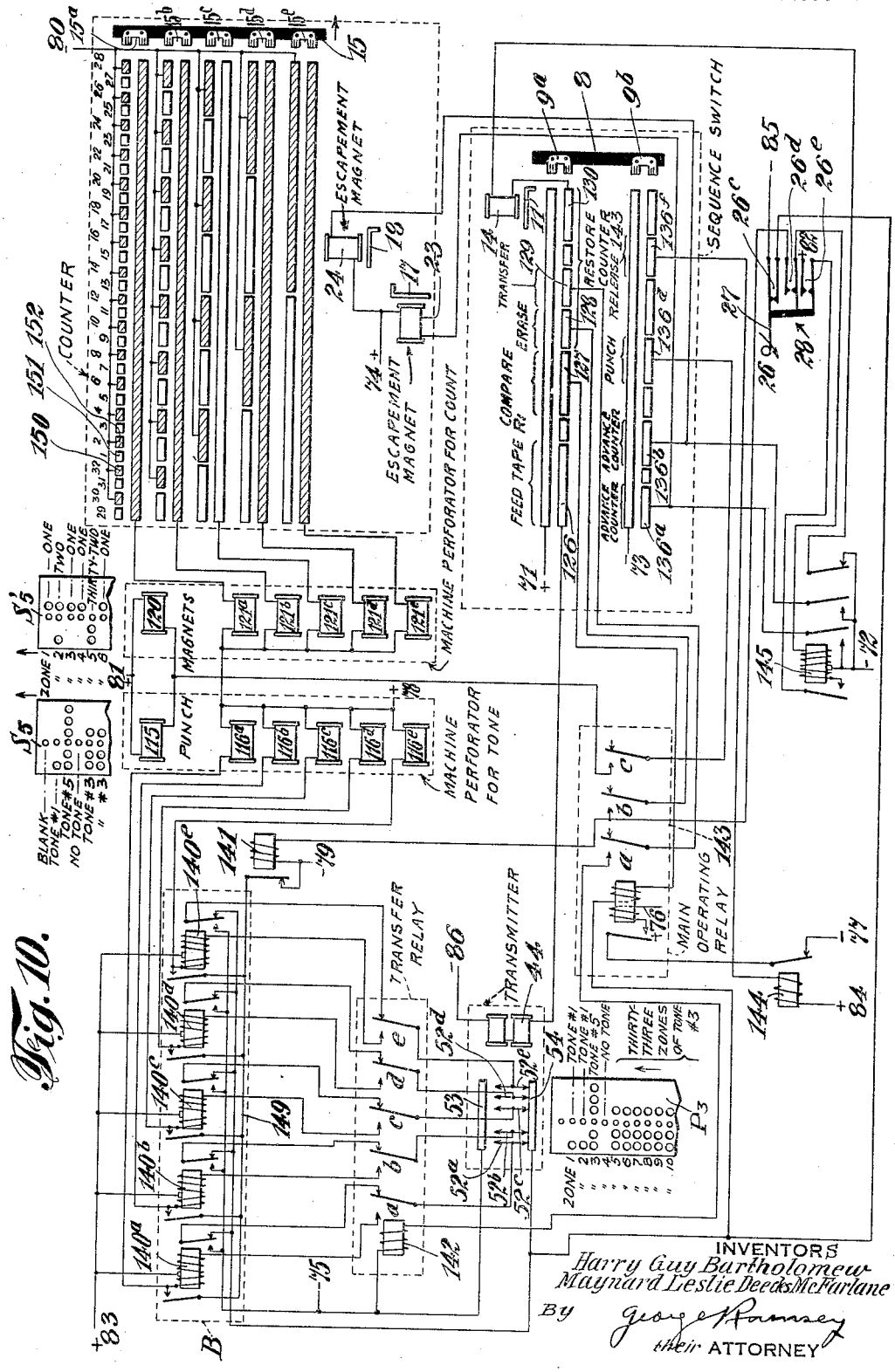

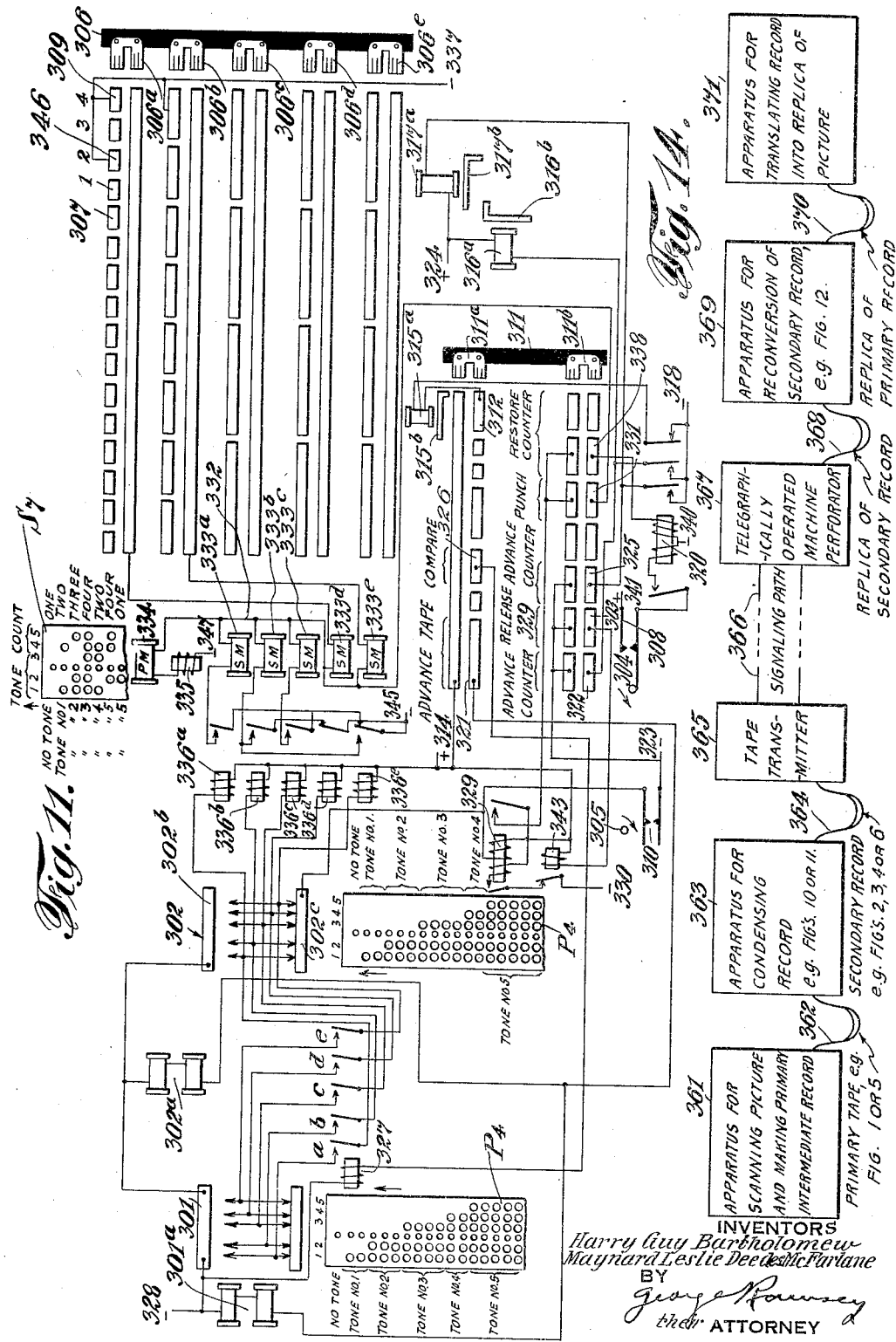

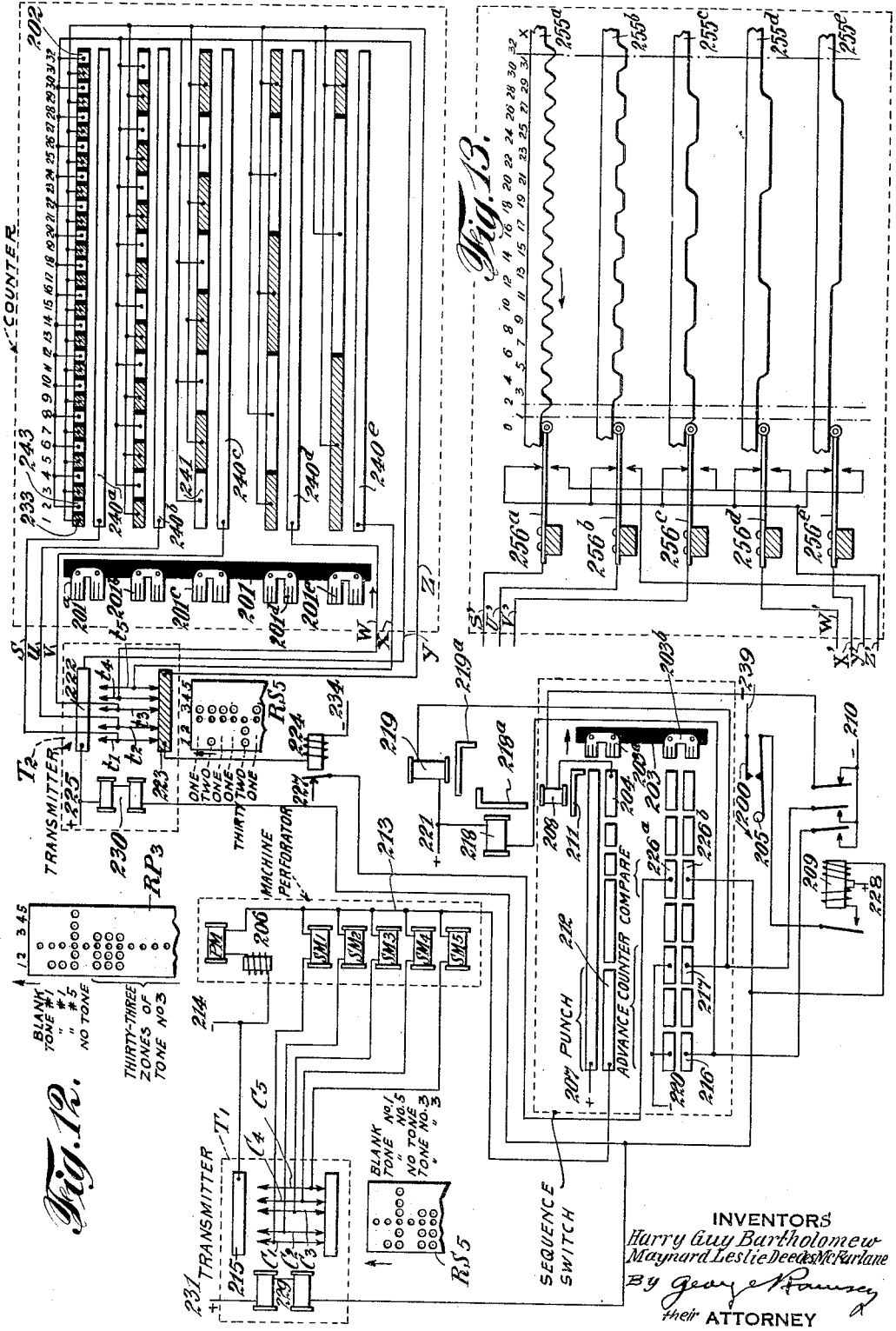

Patented May 23, 1933

1,910,586

UNITED STATES PATENT OFFICE

HARRY GUY BARTHOLOMEW, OF LONDON, ENGLAND, AND MAYNARD LESLIE DEEDES McFARLANE, OF NEW YORK, N. Y.

TELAUTOGRAPHY OR PHOTOTELEGRAPHY

Application filed July 9, 1929, Serial No. 376,937, and in Great Britain October 16, 1922.

This invention relates to telautography or phototelegraphy; and this application is a continuation in part of our prior application Serial No. 668,736, filed October 15, 1923.

In the specifications of our British Letters Patent No. 195,577 of 1923 and our U. S. Patent No. 1,653,425, we have described the production of an intermediate record of a picture in the form of a punched tape of the character employed in the five unit code, that is to say, a punched tape in which each unit corresponds to an elemental area of the picture and consists of a group of holes arranged transversely to the direction of travel of the tape; and in the specifications in question there is described the employment of a tape of this character in controlling the exposure of successive small areas of a light sensitive surface to produce a replica of the original picture.

It will be found that in the pictorial representations of a majority of subjects successive small areas are of the same tone and often the number of successive small areas of a given tone is considerable. Therefore, if the tone of each successive area is punched in a tape, (i. e. if there is a separate tape unit for each elemental area of the picture), a large number of the successive groups of holes comprises the same number of holes. In transmitting by means of such a tape an unnecessarily large amount of time is occupied.

Similarly, if the intermediate record is formed otherwise than on a tape by punching, (for instance, if it is formed on a wax cylinder by making thereon indications of the tone value of each of the successive small areas) a large number of successive indications are of the same character. Whatever may be the form of the record, if the tone of each of the successive small areas is represented by an individual indication, or if by any other means a separate individual indication is transmitted for the tone of each elemental picture area, an unnecessarily large amount of time is occupied in transmitting.

The object of the present invention is in general to enable the time occupied in transmitting a record of the picture to be reduced.

According to the invention the results of the analysis of the original to be transmitted are divided into two portions, one indicative of the tones and the other expressing the number of times each tone occurs in succession. In other words, the one portion will simply indicate changes of tones and the other the number of small areas of the original occurring in succession between each change of tone. These two portions of the analysis may be recorded or they may, through suitable means, be used directly in controlling apparatus at the receiving station adapted to reproduce a visual representation of the original. The production of records is, however, probably to be preferred as the records may be checked and further they can be produced in a form acceptable to cable and telegraph companies for transmission by means of the standard apparatus employed by them for transmitting word messages.

For example, if in an original there were forty areas in succession of tone $a$, twenty-five of tone $d$, three of tone $c$ and seven of tone $b$, the portion of the record indicating change of tones would be markings representing the tones in their appropriate sequence, namely, tones $a$, $d$, $c$, and $b$, (the employment of letters in referring to tones being dictated by the desire to avoid the use herein of degrees of comparison) and the other portion of the record having markings representing forty, twenty-five, three and seven.

The invention is not confined to forming the records on tape but extends to forming them on other materials and including forming both the record of the tones and numbers of successive areas of the same tone on one material (e. g. both on a single tape) or forming the record of the number of successive areas of the same tone on one material (e. g. one tape) and the record of the tones on another material (e. g. another tape).

In the following description the employment of tape in forming records will be referred to by way of example. Thus, the two portions of the record may be formed on two tapes, or on different sections of the same tape, which may be a tape marked by any convenient method, but preferably by punching, as transmitters, the operation of which is controlled by punched tape, are in common use.

In the above-mentioned specification certain modes of producing intermediate records in the form of a punched tape corresponding to variation in tone value of a pictorial representation of a subject are described, including the production of a punched tape of the so-called five unit type. One feature of the present invention is the utilization of certain of the five marking holes of a five unit code tape (e. g. the marking holes on one side of the feed holes) for recording the number of times the several tone values recur in succession and the remaining marking holes (e. g. the marking holes on the other side of the feed holes) for recording the tone values. In some circumstances, this is perhaps the preferred method of making the records but it is to be understood that the production of two tapes, the one being a record of the number of times the several tone values recur in succession and the other a record of the tone values, is equally included within the scope of the present invention.

The production of these records may be effected directly from the pictorial representation or from an intermediate record which is not a visual equivalent of the original in the form, for instance, a punched tape in which the tone value of each successive area is marked, that is to say, a tape in which there is an individual punched section for each elemental area of the picture.

As will be understood, a wide variety of mechanical and electrical devices or combinations thereof are available for securing the result aimed at and the invention extends to apparatus adapted to divide the results of the analysis of the original into two portions, one indicative of the tones, the other expressing the number of times each tone occurs in succession. An apparatus in accordance with this phase of the invention will consist essentially of means actuated to record change of tone and means adapted to count and record the number of areas occurring in succession between each change of tone. Thus, the apparatus may comprise a tone recording device, means adapted to count and record the number of areas and means interconnecting the tone recording device and the counting means whereby the counting operation is interrupted, the record of the total made, the counting means set to the initial position and the counting operation restarted at each change of tone.

When a primary intermediate record in the form of a punched tape is made at the transmitting station from a visual representation of a subject, the apparatus may comprise means whereby a second perforating or marking machine may be operated to make a secondary intermediate record of each change of tone depicted on the primary intermediate record, means adapted to count and record the number of areas represented on the primary intermediate record, and means brought into operation when the number of marking holes in a zone of the primary record exceeds or falls below the number in the preceding zone to interrupt the counting operation, record the total on a portion of the same tape or upon a separate tape, set the counting mechanism to the initial position and restart the counting operation.

For operating on a primary intermediate record in the form of a punched tape of the five unit code type, the tape may be caused to travel relatively to means whereby electric contact may be effected through the presence of marking holes, such contact operating to effect the marking of a second tape (secondary intermediate record) as for instance, by punching, the operation of the punches for the secondary record being delayed until a zone in the primary intermediate record comprising a fewer or greater number of holes is reached whereupon the secondary record is punched in accordance with the tone of the primary tape and the number of tones that tape has been advanced in the interval between the operation of the punches for the secondary tape or record.

The invention also extends to apparatus adapted to be controlled by the secondary intermediate records formed in the manner indicated, to reproduce a replica of the primary intermediate record from which a replica of the original picture may be reproduced.

Apparatus for use in telautography or phototelegraphy in accordance with the invention is illustrated by way of example in the accompanying drawings, in which:—

Fig. 1 is a fragment of a primary intermediate record of a picture, in the form of a standard telegraphic tape punched in the so-called five unit code.

Fig. 2 is a fragment of a secondary intermediate record corresponding to the primary intermediate record or tape shown in Fig. 1.

Fig. 3 is a fragment of a second form of secondary intermediate record or tape corresponding to the primary tape shown in Fig. 1.

Fig. 4 is a fragment of a third form of secondary intermediate record or tape corresponding to the primary tape shown in Fig. 1.

Fig. 5 is a fragment of a primary intermediate record of a picture, which record uses only three of the five positions on a standard telegraphic tape of the five unit code type.

Fig. 6 is a fragment of a secondary intermediate record or tape corresponding to the primary tape shown in Fig. 5.

Fig. 7 is an elevation of a Western Electric 5B start-stop distributor modified to act as a counter and sequence switch for an apparatus to automatically punch a secondary intermediate record from a primary intermediate record.

Fig. 8 is a plan view of the apparatus shown in Fig. 7.

Fig. 9 is a diagrammatic view showing a Western Electric 1B multiplex transmitter which may be used to read the primary tape.

Fig. 10 is a schematic diagram of an apparatus for automatically punching a secondary intermediate record from a primary intermediate record.

Fig. 11 is a schematic diagram of a modified form of apparatus for automatically punching a secondary intermediate record from a primary intermediate record.

Fig. 12 is a schematic diagram of apparatus arranged to reconvert the secondary record to the primary record.

Fig. 13 is a diagrammatic illustration of an alternative type of counter that may be used in the apparatuses of Figs. 10, 11 and 12.

Fig. 14 is a diagrammatic representation of an entire picture transmission system embodying the present invention.

*Types of records and method of making*

In Fig. 1, the results of the analysis of a picture to be transmitted are punched on a standard telegraphic tape in the so-called five unit code. The expression "five unit code" does not designate any particular code, but merely means that five units are available for forming the code. From these available units a variety of suitable codes may be formed.

The tape may be conveniently considered as made up of a plurality of zones, each zone consisting of a short length of tape adapted to receive a transverse row of perforations. In Fig. 1 there are seventy-one zones, each of which corresponds to an individual elemental area of the picture (e. g. a fiftieth of a square inch of the picture). For convenience, the seventy-one tape zones in Fig. 1, may be considered as numbered from zone 1 to zone 71. The code combination which is punched in any tape zone depicts the tone value of the elemental picture area corresponding to that zone.

The tones of the picture may be divided arbitrarily to give six tone values, "no tone" for jet black, "tone No. 5" for white, and tones numbered 1, 2, 3 and 4 for progressive greys between black and white. In Fig. 1 the code used depicts each tone value by a number of marking perforations equal to the arbitrarily assigned tone number.

A number of means are known to the art for scanning a representation of a picture and automatically producing a primary intermediate record or tape such as shown in Fig. 1. Apparatus for this purpose is shown in our British and United States patents previously referred to. In the present commercial practice tapes are made up, such as shown in Fig. 1, from a representation of a picture which it is desired to transmit, e. g. from New York to London. The tape is delivered to a telegraph or cable company in New York which "transmits" the tape by means of its standard telegraph equipment to London. This transmission of the tape consists in feeding the tape into a machine in New York, which machine causes electrical impulses to be transmitted over a cable to London, where the impulses operate a perforator to punch a replica of the tape used in New York. The transmitted tape is then used in London to produce a replica of the original picture. This reproduction of the picture from the tape may be done in any suitable manner such as that described in our patents previously referred to. The telegraph companies charge for transmitting the tape in accordance with the time required to effect the transmission, which in turn depends upon the length of the tape. In other words, their toll charges are a certain number of dollars per hundred feet of tape.

If the tape to be delivered to the telegraph companies can be shortened, the toll charges will be correspondingly diminished; and in Fig. 2, there is shown a shortened or condensed record corresponding to that shown in Fig. 1. This shortened record is on standard telegraphic tape in a five unit code. The condensed record shown in Fig. 2 may be produced from the record shown in Fig. 1 and therefore, a record such as shown in Fig. 1 may be referred to as a "primary" intermediate tape or record and that shown in Fig. 2 as a "secondary" intermediate tape or record. In its simplest aspect, this phase of the invention may be practiced by taking the tape shown in Fig. 1, noting the tone values depicted, counting the number of times each tone value occurs in sequence, and manually punching the tone and count in the tapes of Fig. 2. The operator sees that zones 1 to 8, inclusive of tape $P_1$ each depict "no tone" and he punches "no tone" in the first zone of tape $S_1$, and "eight" in the first zone of tape $S_1'$. He then sees that zones 9 to 15, inclusive of tape $P_1$ depict "tone No. 1"; and in the second zone of tape $S_1$, he punches "tone No. 1", while in the second zone of tape $S_1'$ he punches "seven". The condensation of the record is continued in this manner.

The maximum count which can be depicted with a five unit code is thirty-two. Zones 37 to 71, inclusive of tape P are each for tone No. 1 which requires a count of thirty-five. Accordingly, the operator first punches "tone No. 1" in tape $S_1$ with a count of "thirty-two" in tape $S_1'$ and he follows this by "tone No. 1" in tape $S_1$, with a count of "three" in tape $S_1'$.

The extent to which the record is shortened in this instance is obvious from a comparison of the length of tape in Fig. 2 to the length of tape in Fig. 1. With actual pictures, the invention has saved as much as 80% of the length of the tape, which means a corresponding saving in transmission charges.

In Fig. 3, alternate zones of the secondary tape $S_2$ are punched in accordance with the tone value and the intermediate zones are punched in accordance with the count, so that as the tape is traversed from its forward end, one zone depicts the tone value and the next zone depicts the count for that tone value. The tape $S_2$ contains the same record as tape $P_1$ and may be made from tape $P_1$ by procedure analogous to that used in making the record of Fig. 2, but first the tone is punched and then the count is punched so that tape $S_2$ has on alternate zones the marking shown in tape $S_1$ and on the intermediate zones the markings shown in tape $S_1'$.

In Fig. 4, the primary record of Fig. 1 has been condensed to a secondary tape $S_3$ in which each tape zone gives both the tone and the count for that tone. In Fig. 1, there are six tone combinations, ranging from "no tone" to "tone No. 5" and these are indicated (in a different code) with three positions on the tape $S_3$, thus leaving two positions available for indicating the count. This limits the range of the count to four, and hence where more than four like tones occur in sequence in tape $P_1$, the tone must be repeated in succeeding zones of the tape $S_3$ until the count is completed. Fig. 4 which is self explanatory depicts the same record as Fig. 1.

Fig. 5 shows a primary tape $P_2$ in which the tones of the picture are assigned only four values, black, dark grey, light grey and white. This primary record may be condensed into a secondary record such as shown in Fig. 6. The four tone values are depicted upon the first two positions in the tape $S_4$, thus leaving the last three positions for the count. With three positions for the count, the count may be carried to a maximum of eight. Fig. 6, which is self explanatory, shows the record of Fig. 5 condensed in this manner.

The condensed tapes of Figs. 3, 4, and 6 may be made by procedure analogous that used in making the condensed record of Fig. 2. In each case the condensed record has been described as being made by hand, but the method may also be carried out by automatic apparatus. Such apparatus will now be described.

APPARATUS FOR MAKING CONDENSED RECORD

*Example I*

Reference will now be had to Figs. 7 and 8. A conventional electric motor 1 is connected through a coupling 2 and reduction gearing in a gear box 3 to continuously rotate a shaft 4. On the ends of shaft 4 are friction clutches 5 and 6, which operate to rotate respective brush arms 15 and 8 whenever these arms are released for rotation. The construction thus far referred to in these figures is well known in the art and is that of the Western Electric 5B start-stop distributor. One brush arm 15 is mounted as shown on a toothed disc 7 which has a cut-out portion $7^a$. The brush arm 15 carries five brushes $15^a$ to $15^e$ that project through the opening $7^a$ and are adapted to sweep over a series of contacts on stationary face 16 when the toothed disc 7 rotates. The contacts on face 16 (with associated brushes, etc.) constitute a "counter" which will be referred to later. The teeth of disc 7 are adapted to engage two latch members 17 and 18, pivoted at 19 and 20 respectively, and urged into engagement with the teeth of the disc by springs 21 and 22, respectively. These latches have the relative position shown in Fig. 7 and are adapted to be respectively retracted by electromagnets 23 and 24. By a circuit which will be later described, the latches 17 and 18 are retracted alternately, thus allowing the disc 7 to rotate in a step by step manner, each step being half the distance between the teeth on the disc. In other words, these two latches which are alternately retracted constitute an escapement for the disc 7, and consequently produce step by step rotation of brushes $15^a$ to $15^e$.

The disc 7 carries a pin 26 which once in each revolution of disc 7 operates switching key 28 for a purpose to be described later.

A brush arm 8 carrying two brushes $9^a$ and $9^b$ is rotated by friction clutch 6 when left free to rotate so that the brushes sweep over segments of a sequence switch formed on face 10. A latch 11, pivoted at 12, and urged by spring 13 is operative to arrest brush arm 8 in a horizontal position. This latch can be retracted by an electromagnet 14 whereupon the brush arm 8 makes a complete revolution with respect to the face 10. Leads from segments of the sequence switch on face 10 and from the contacts on face 16 are brought out to a terminal strip 25.

In Fig. 9, a standard telegraphic tape punched in the five unit code (such as the tape shown in Fig. 1) passes over a feed wheel 40, pivoted at 39, and having teeth which engage the feed holes in the tape and advance the tape in a step by step movement. Arranged transversely of the tape is a row of five feeler fingers, one of which 29 is shown. These feeler fingers are movable vertically and as they rise, they assume the position of feeler finger 29 if a perforation is encountered in the tape, and if no perforation is encountered in the tape, the top of the feeler finger is held below the tape.

A two coil electromagnet 44 is adapted, when energized, to attract armature 45 having an arm 46$^b$ carrying a spring 46 which engages projections such as 47 on the feeler fingers. When the electromagnet 44 is energized, all of the feeler fingers are withdrawn from the tape. Arm 46$^b$ also carries a pressure face 48 that engages face 49 of lever 34, thereby elevating push rod 32 and causing pawl 33 to advance ratchet 38 and feed wheel 40 one step. The ratchet 38 is acted upon by a detent 41, carried by lever 42, actuated by spring 43, so that the ratchet and feed wheel can be moved step by step and will be held in position at each step. Pawl 33 is pivoted to push rod 32 and is biased by spring 36 attached to a stationary part 37, so that upon downward movement of the push rod 32, under action of spring 35, the pawl rides idly over the feed wheel ratchet 38.

Associated with each feeler finger is a contact member such as 52 and each of the five contact members are adapted to engage either a common bus 53 or a common bus 54. As the feeler finger descends, projection 47$^a$ allows the arm 50 to rotate in a clockwise direction under the action of spring 51 so that contact 52 is transferred to bus 54. When the magnet 44 is deenergized, springs such as 31 raise arms such as 30 and thereby elevate the feeler finger 29. If the feeler finger encounters a perforation, it is elevated to position shown in the drawings and contact 52 is transferred from bus 54 to 53. If the feeler finger does not encounter a counter perforation, the end of the feeler finger is held below the tape and contact 52 remains on common bus 54.

In Fig. 10, a primary record $P_3$ (of the type shown in Fig. 1) is fed into a transmitter such as shown in Fig. 7; and the apparatus translates this primary record into a secondary record on tapes $S_5$ and $S_5'$ of the type shown in Fig. 2. As the tape $P_3$ advances through the transmitter step by step, the transmitter reads the zones of the tape and as long as there is no change in tone, nothing takes place except that the counter advances one step for each step of the transmitter to record the count. The counter is formed on face 16 (Fig. 8) and is shown in developed form in Fig. 10. The results of the count are set up on the selector magnets for count so that when the punch magnet 120 is operated, the count will be punched in tape $S_5'$.

The specific forms of transmitter, perforator, relays, and sequence switch form no part of the present invention, and any suitable type known to the art may be employed.

The tone combination read by the transmitter is transmitted to the relay bank B by the transfer relay. This tone combination standing upon the relays of bank B is set up on the selector magnet for tone so that when the punch magnet 115 is operated, the tone will be perforated in tape $S_5$. At each reading of the transmitter, the transmitter reading is compared to the reading set up on the relays of bank B, and as long as the two readings are the same, nothing happens except that the counter advances. When, however, a comparison of the transmitter reading with the relay bank B shows a change in reading, the main operating relay is operated, and thereafter the sequence switch controls the apparatus to (a) punch the tapes $S_5$ and $S_5'$ in accordance with the settings of the selector magnets for tone and the selector magnets for a count, (b) wipe out the combination standing on the relays in bank B, (c) transfer the new combination from the transmitter to relay bank B, (d) release the main operating relay 143, and (e) restore the counter to zero for the next count.

Machine perforators of any well known and suitable types may be used for punching tapes $S_5$ and $S_5'$. A type of perforator which may be used is the 6A machine perforator of the Western Electric Co., shown in our patents previously referred to.

The operation will be traced for the combinations shown on tape $P_3$. Start with the system completely deenergized, all relays in non-operated position, brush 15$a$ on segment 150, pin 26 resting against key 28 so that the key contacts are in the position shown, and brush 9$a$ resting upon segment 130 with latch 11 holding the brush arm 8 against rotation, also, escapement latches 17 and 18 holding the brush arm 15 against rotation.

(A) *Two zones of tone No. 1 in tape $P_3$*

Current is turned on and the motor 1 (Fig. 7) rotates continuously so that the brush arms 8 and 15 will be advanced whenever they are released. Brush 9$a$ completes a circuit from +71, segment 130, latch magnet 14, back contact of relay 145 to −72, thus withdrawing the latch 11 and allowing the brush arm 8 to rotate. At segment 126, brush 9$a$ completes the circuit from +71, through the transmitter stepping magnet 44, to −86, thus withdrawing the feeler fingers from the tape (which puts the contacts 52$^a$, etc., into the position shown in the drawings) and advancing the tape $P_3$ one step. At segment 136$^a$, brush 9$^b$ completes a circuit from −73 through escapement magnet 23 to +74, thus allowing the counter to move forward half a step towards segment 151. This movement of the counter advances pin 26 so that contact 26$^c$ opens and contacts 26$^d$ and 26$^e$ close. At segment 136$^b$, brush 9$^b$ completes a circuit from $-73$ through escapement magnet 24 to $+74$, thus allowing the counter to step forward another half step and come to rest on segment 151 for a count of one.

When brush 9$^b$ leaves segment 136, stepping magnet 44 is deenergized and the feeler fingers rise. Where any feeler finger encounters a perforation in tape P$_3$, its corresponding contact (52$^a$, etc.) is transferred from bus 54 to bus 53. The first zone of tape P$_3$ has only a single perforation in position 1, so that the contact 52$^a$ will be transferred to bus 53 and the contacts 52$^b$, 52$^c$, 52$^d$, and 52$^e$ will remain in contact with bus 54.

When the brush 9$^a$ reaches segment 127, the transmitter reading is compared to the reading set upon relay bank B. Since the apparatus has just been started, all of the relays in bank B are in a deenergized position, which corresponds to a tape reading of "no tone". Accordingly, since "tone No. 1" is standing in the transmitter, there is a difference in reading between the transmitter and the relay bank B, and hence upon comparison of the two, the main operating relay 143 will be operated as has been previously mentioned. The circuit is from $+71$, segment 127, relay 143, back contact of relay 140$^a$, back contact 142$^a$, contact 52$^a$, bus 53 to $-75$, thus operating relay 143. Relay 143 locks up by a circuit from $+76$ to $-77$.

When the brush 9$^b$ reaches segment 136$^d$, circuit is made from $-73$, to front contact 143$^c$, punch magnets 115 and 120 in parallel, to $+81$, thus operating the perforators to punch tape S$_5$ and S$_5'$. The combination punched is for the combination standing in relay bank B and the count punched is for the count of like zones in sequence that have passed through the transmitter, not including the tape zone standing in the transmitter at the instant. Since the apparatus has just been started, the only thing that has passed through the transmitter is a blank, (i. e. "no tone") which is the condition of the relays in bank B, and the count of this blank is "one". Accordingly, the first zones of tapes S$_5$ and S$_5'$ are punched for a blank and a count of one. This blank with a count of one at the beginning of tape S$_5$ may be disregarded, because it does not correspond to anything in tape P$_3$, and in practice, there is always a section of blank tape at each end of the picture record.

When the brush reaches segment 128 circuit is made from $+71$, front contact 143$^b$, relay 141 to $-79$ thus operating relay 141, and breaking the lock-up circuits to the relays in bank B. This lock up circuit is from $+83$ through the left hand contacts of the relays in bank B to conductor 149 and $-79$. In this instance, none of the relays in bank B were standing in operated position so the breaking of the lock-up circuit is an idle operation, but it is for the purpose of getting all relays in bank B in the non-operated position so that the new combination standing in the transmitter may be transferred to the relays in bank B.

At this same time, circuit is also made from $+71$, segment 128, front contact 143$^b$, key contact 26$^d$ to relay 145 and $-72$, thus operating relay 145 which locks up by a circuit from $-72$ through key contacts 26$^e$ to $+82$. Relay 145 makes two parallel circuits from $-72$ through the front contacts of relay 145 to escapement magnets 23 and 24, respectively, to $+74$. This withdraws both latches of the counter escapement mechanism and allows the counter brush 15 to be continuously advanced by the driving motor.

We left brush 9$^a$ on segment 128. When it advances to segment 129, circuit is made through front contact 143$^a$ and relay 142 to $-75$, thus operating relay 142. This transfers the combination on the transmitter to relay bank B. Only the first feeler finger of the transmitter has encountered a perforation, so only relay 140$^a$ will pick up. The circuit is from $+83$, relay 140$^a$, front contact 142$^a$, transmitter contact 52$^a$, bus 53, to $-75$. Relay 140$^a$ locks up by a circuit from $+83$, relay 140$^a$ and its left hand armature, conductor 149 to $-79$.

When brush 9$^b$ reaches segment 136$^f$, circuit is made from $-73$, through relay 144 to $+84$, thus breaking the lock-up circuit to relay 143 and allowing this relay to release.

When the brush arm 8 reaches segment 130, it will be arrested because relay 145 is locked up and hence no circuit can be made from $+71$, segment 130, latch magnet 14, to $-72$. Accordingly, brush arm 8 now stands still and brush arm 15 is being continuously advanced. As the brush 15$^a$ approaches segment 150, the pin 26 strikes the key 28, breaking at 26$^e$ the lock-up circuit for relay 145, thus releasing relay 145 and breaking the circuits from $-72$ to escapement magnets 23 and 24. Accordingly, the escapement magnets are deenergized and the escapement latches arrest the rotation of brush arm 15. The key 28 is so designed that the breaking at 26$^e$ will take place as the counter is advancing toward segment 150 and cause the release of relay 145 and escapement magnets 23 and 24 in time to arrest the brush arm 15 with the brush 15$^a$ resting on segment 150, and with the pin 26 holding the key in the position shown in the drawings.

Relay 145 now being released and brush 9$^a$ being on segment 130, circuit is made from $+71$ through the latch magnet 14 to $-72$, thus withdrawing latch 11 and permitting the brush arm 8 to again revolve. When brush $9^a$ reaches segment 126, tape stepping magnet 44 is energized, the feeler fingers withdrawn from the tape, and the tape advanced one step. At segment $136^a$, brush $9^b$ causes escapement magnet 23 to be energized as previously explained, thus stepping the counter forward one half a step. At segment $136^b$, the brush $9^b$ causes the counter to be stepped forward another half step to segment 151 for a count of one.

When brush $9^a$ leaves segment 126, stepping magnet 44 is deenergized, and the feeler fingers rise. Again only the first feeler finger encounters a perforation. When segment 127 is reached, nothing will happen because the circuit from this segment is from $+71$, segment 127, relay 143, back contact of relay $140^a$. This relay is now standing in its operated position and hence the circuit is broken at this point. Neither can the circuit be completed through the back contacts of any of the non-operated relays because the circuit, e. g. through the armature of relay $140^b$ would run from its back contact, back contact $142^b$, contact $52^b$, bus 54 (second feeler finger being down), and back to relay 43 which gets nowhere. Accordingly, relay 143 is not operated at segment 127, and hence no punching can take place at segment $136^d$. No operation of relay 141 can take place at segment 128 to wipe out the combination standing in relay bank B, and at segment 129, no operation of relay 142 can be effected.

Relay 145 is standing in its non-operated position and hence when the brush reaches segment 130, latch 11 will be withdrawn and the brush will continue to revolve.

At segment 126, the tape is again stepped forward one step. At segment $136^a$, the counter is stepped forward half a step toward segment 152; and at segment $136^b$, the counter is stepped forward another half step to segment 152 for a count of "two". It should be noted that this count corresponds to the number of tape stages which have passed through the transmitter in which the left hand feeler only encountered a perforation, viz., the two stages of "tone No. 1" on tape $P_3$.

When the brush leaves segment 126, the feeler fingers rise and suppose that they all encounter perforations, tone No. 5 on tape $P_3$. When the brush reaches segment 127, circuit is made from 71, segment 127, relay 143, back contacts of any of the relays $140^b$, $140^c$, $140^d$ and $140^e$, any of the back contacts 142, $b$, $c$, $d$, and $e$, any of the contacts $52^b$, $52^c$, $52^d$ and $52^e$, bus 53 to $-75$, thus operating relay 143. It should be noted that relay $140^a$ is the only relay in bank B which is standing in its operated position. This corresponds to the previous tape reading in which only the left hand feeler finger encountered a perforation. In accordance with the settings of the relays in bank B, selector magnet $116^a$ is energized by circuit from $+78$, selector magnet $116^a$, lock up contact of relay $140^a$, conductor 149, to $-79$. Accordingly, when punch magnet 115 is operated, one perforation will be punched in the tone tape $S_5'$. When brush $9^b$ reaches segment $136^d$ circuit is completed to the punch magnets 115 and 120 and hence the perforations of both tapes $S_5$ and $S_5'$ take place, selector magnet $116^a$ being energized in the tone selector magnet group, and selector magnets $121^a$ and $121^c$ being energized (for a count of two) in the count selecting magnet group.

At segment 128, wipe-out relay 141 is operated, thus releasing any relay in bank B which is standing in operated position. At segment 129, relay 142 is energized, thus causing the relays in bank B to be operated in accordance with the reading of the feeler fingers of the transmitter. It has been assumed that all feeler fingers have come up. Accordingly, circuit is made from $+83$, each of the relays in the bank B, each of the front contacts of relay 142, each of the transmitter contacts $52^a$ to $52^e$, bus 53, to $-75$, thus operating all of the relays in bank B and causing them to be locked up. As has previously been explained, when brush $9^a$ was on segment 128, relay 145 was operated so that the escapement latches have been withdrawn by escapement magnets 23 and 24, and the counter is being turned around by the motor. At segment 130, the latch 11 arrests the brush until the counter has arrived at segment 150 and relay 145 has been released by pin 26 operating key 200.

The latch 11 is now withdrawn and the brush moves on. At segment $136^a$, the counter is advanced one half step toward segment 151, and at segment $136^b$, the counter is advanced to segment 151 for a count of "one".

In the meantime, the tape stepping magnet 144 has been energized from segment 126 and when brush $9^a$ leaves this segment, the feeler fingers rise for the next reading. Suppose that none of the feeler fingers encounter perforations, i. e. "no tone", in tape $P_3$. Then, when brush $9^a$ reaches segment 127, circuit is made from $+71$, segment 127, relay 143, bus 54, any of the back contacts $142^a$, etc., any of the front contacts of the relays in bank B, (all of these relays being in the operated position) to $-75$, thus operating relay 143.

All of the relays in bank B being selected, all of the selector magnets $116^a$, etc., are selected to punch the tone combination and selector magnet $121^c$ is selected for a count of one. When brush $9^b$ reaches segment $136^d$, the punch magnets 115 and 120 are energized and the combinations selected by the selector magnet are punched. When brush $9^a$ reaches segment 128, relay 141 is operated and all of the relays in bank B are released. When brush $9^a$ reaches segment 129, relay 142 is operated to transfer the transmitter setting to bank B, this being merely an idle movement in this instance, as none of the feeler fingers encountered a perforation.

The operation continues as before described, it being noted that whenever the transmitter encounters the same combination which has been encountered on the previous reading, nothing takes place except that the counter is advanced one count; and then when the transmitter encounters any different combination, relay 143 is operated, and subsequently the previous reading of the transmitter is punched in the tape $S_5$ and the count is punched in tape $S_5'$. Then the relay bank B is cleared and the new combination is transferred from the transmitter to the relay bank.

The maximum range of the counter shown in the drawings is for a count of thirty-two, because this is the maximum count with a five unit code. Suppose that there be thirty-three consecutive readings that are all alike, and assume that this reading is such that the first three feeler fingers encounter perforations and the last two do not encounter perforations, i. e. "tone No. 3" in tape $P_3$. The counter will be advanced at each reading until with brush $9^b$ on segment $136^b$, the counter will be advanced to segment 150 for a count of thirty-two. This brings pin 26 and key 28 to the position shown in the drawings. Then, when brush $9^a$ reaches segment 127, circuit will be made from +71, segment 127, relay 143, contacts $26^c$ to −85, hence relay 143 will be operated and with the result that as the brush continues to revolve, the count of thirty-two will be punched and the combination (selector magnets $116^a$, $116^b$, and $116^c$ being energized) will be punched in the tape. Then when brush $9^a$ reaches segment 128 the relay bank B will be cleared and at segment 129, the combination (left three feeler fingers only up) will be retransferred to the relay bank B. The operation will then continue as has previously been described.

*Example II*

The bank of lock-up relays in Fig. 10 may be dispensed with, two original intermediate records being used in combination with two "readers" or transmitters, one operating one step behind the other. One transmitter then takes the place of the lock up-relays and its reading is compared with that of the second transmitter in the same manner as in the arrangement of Fig. 10. In other words, when the two transmitters operating on identical tapes, one of which is one step in advance of the other, register a difference in the number of holes, current is permitted to pass to operate the punches forming the two portions, one indicative of the tones and the other expressing the number of times each tone occurs in succession. This form of apparatus is illustrated in Fig. 11.

When the picture is scanned and the primary tape is punched, two tapes are fed into the perforator, one on top of the other, so that the primary tape is punched in duplicate. These duplicate tapes $P_4$ and $P_4'$, are so started into two transmitters, 301 and 302, that tape $P_4'$ is one step ahead of tape $P_4$. The transmitters operate in unison and at each step the readings of the two transmitters are compared in the same manner that the single transmitter reading in Fig. 10 was compared to the reading of the bank of lock-up relays. While the readings are the same, punching of the secondary intermediate record $S_7$ is withheld and the number of readings of transmitter 302 is set up on the counter. When the readings differ, the tone and the count are punched in the secondary record $S_7$, the counter is restored to starting position, and the operation begins over again.

It will be noted that in Fig. 11 the apparatus is arranged to punch a condensed record of the form shown in Fig. 4, viz., both the tone and the count are on a single tape, the tone being marked in the first three positions on the tape, and the count being marked in the last two positions. Since the maximum count with this form of condensed record is four, only the last four positions on the counter are used, these being used to give a count of from 1 to 4. In this case, the toothed disc 7 (Fig. 2) is provided with two pins, 304 and 305 (Fig. 11). When the brush $306^a$ rests on segment 307, pin 304 holds the key 308 open, as shown in the drawings, and when the brush $306^a$ rests on segment 309, the pin 305 holds the key 310 closed.

The operation will be traced for the primary tape $P_4$ shown in the drawings. Start with the system completely deenergized, brush $311^a$ resting upon segment 312, brush $306^a$ resting upon segment 307, and pin 304 holding the key 308 open. The tape $P_4$ is so placed in transmitter 302 that upon being advanced one step the first zone of this tape will be read by transmitter 302; and tape $P_4'$ is placed in transmitter 301 one step ahead of tape $P_4$. Current is turned on and motor 1 (Fig. 1) rotates, driving brush arm 311, except when arrested by latch $315^b$, and advancing brush arm 306 as permitted by escapement latches $316^b$ and $317^b$.

*(a) Single zone of "no tone" in tape $P_4$*

Circuit is made from +314, brush $311^a$, segment 312, latch magnet $315^a$, back contact of relay 320, to −318, thus withdrawing latch $315^b$, and permitting brush arm 311 to advance. At segment 321, brush $311^a$ completes circuits from +314, through transmitter magnets $301^a$ and $302^a$ (in parallel), to −328, thus advancing each of the tapes $P_4'$ and $P_4$ one step. At segment 322 brush $311^b$ completes circuit from −323, segment 322, escapement magnet $316^a$, to +324, thus allowing the counter to step forward one half step (which releases key 308). At segment 303, brush 311$^b$ causes operation of relay 343, the operation being an idle one in this instance. At segment 325 brush 311$^b$ completes circuit from −323, segment 325, escapement magnet 317$^a$ to +324, thus advancing the counter another half step for a count of "one".

At segment 326 brush 311$^a$ completes circuit from +314, segment 326, comparison relay 327 to −328, thus operating comparison relay 327 and thereby connecting each contact of transmitter 301 with the corresponding contact of transmitter 302. Transmitter 302 is reading the first zone of tape P$_4$, (which is "no tone"), and transmitter 301 is reading the second zone of tape P$_4'$, which is "tone No. 1". Accordingly, in transmitter 302 none of the feeler finger contacts are up, and in transmitter 301, the first contact only is up. Current flows in a circuit from −328, first contact of transmitter 301, relay contact 327$^a$, first contact of transmitter 302, bus 302$^c$, relay 329, to +314, thus operating relay 329, which locks up by circuit from −330 to +314.

Relay 329 being in operated position, brush 311$^b$, at segment 331, makes positive the common conductor 332 of the selector magnets 333$^a$ to 333$^e$ and the punch magnet 334. The circuit is +314, contact relay 329, segment 331, to conductor 332. Accordingly, the tone selector magnets 333$^a$ to 333$^c$ will be energized in accordance with the tone read by transmitter 302; and the count selector magnets 333$^d$ and 333$^e$ will be energized in accordance with the count standing in the counter. The punches selected by the selector magnets will be operated by punch magnet 334, the operation of the punch being delayed if necessary by retardation coil 335.

In this instance ("no tone" being read by transmitter 302) none of the contacts of transmitter 302 are engaging bus 302$^b$ and hence none of the tone selector magnets 333$^a$, 333$^b$, and 333$^c$ are energized. The selector magnets are controlled through relays 336$^a$ to 336$^e$, which relays are all in non-operated position and hence it is obvious that no connection is made to the tone selector magnets 333$^a$, 333$^b$, and 333$^c$. Also, with the counter standing at a count of "one" no circuit is made from −337 through the count selector magnet 333$^d$ and 333$^e$, conductor 332, segment 331, contact of relay 329, to +314. Accordingly, the punch magnet merely punches a blank in the first zone of tape S$_7$, the blank in tone positions denoting "no tone" and the blank in the count positions denoting a count of "one".

Relay 329 is still locked up, and at segment 338, brush 311$^b$ completes circuit from +314 contact of relay 329, segment 331, relay 320 to −340, thus operating relay 320. Relay 320 locks up by circuit from +341 through key 308 to −340. The operation of relay 320 completes circuits from −318, through escapement magnets 316$^a$ and 317$^a$ to +324, thus withdrawing both the latches 316$^b$ and 317$^b$ and allowing the counter brush arm to be continuously advanced. The operation of relay 320 also breaks the circuit from latch magnet 315$^a$ to −318 so that the brush arm 311 will be arrested by the latch 315$^b$.

As the brush 306$^a$ approaches segment 307 the pin 304 opens key 308 in time to release relay 320 and the latches 316$^b$ and 317$^b$ and bring the counter to rest on segment 307 with brush 304 holding key 308 open.

(b) *Two zones of "tone No. 1" in tape* P$_4$

On the release of relay 320 circuit is completed by brush 311$^a$ (now resting on segment 312) from +314 through latch magnet 315$^a$ to −318, thus withdrawing the latch 315$^b$ and permitting the brush arm 311 to advance. At segment 321 brush 311$^a$ causes the advance of the tapes P$_4'$ and P$_4$, so that the transmitter 302 will read the first zone of "tone No. 1". Transmitter 301 is one step ahead and will also read "tone No. 1". At segment 322, brush 311$^b$ causes the counter to be advanced one half step. At segment 303, brush 311$^b$ causes the operation of relay 343 which effects the release of relay 329. At segment 325, brush 311$^b$ causes the counter to be advanced another half step for a count of "one".

At segment 326 the brush 311$^a$ causes the reading of the two transmitters to be compared, but since they are the same, no current will flow through relay 329. Hence, no punching will take place and relay 320 will not be operated. When brush 311$^a$ reaches segment 312 latch 315 will be withdrawn (relay 320 being non-operated) and the brush will continue to revolve.

At segment 321 the tapes P$_4'$ and P$_4$ are again stepped forward one step so that when the reading is taken transmitter 302 will read the second zone of "tone No. 1" and transmitter 301 will read the first zone of "tone No. 2". At segment 322, the counter is stepped forward one half step. At segment 303, relay 329 is released. At segment 325 the counter is stepped forward another half step, bringing it to a count of "two."

At segment 326 brush 311$^a$ causes the readings of the two transmitters to be compared. The first two contacts of transmitter 301 are up and only the first contact of transmitter 302 is up. Therefore, when relay 327 is operated, current flows in the circuit from −328, second contact of transmitter 301, relay contact 327$^b$, second contact of transmitter 302, bus 302$^c$, relay 329, to +314, thus operating relay 329, which locks up as before. Then, when brush 311$^b$ reaches segment 331, the machine perforator conductor 332 is made positive, as before. Current flows from −328, first contact of transmitter 302, relay 336ª to +314, hence relay 336ª is standing in its operated position, while the relays 336ᵇ to 336ᵉ are standing in non-operated position. Current flows from −345, back contact of relay 336ᵉ, contact of relay 336ª, selector magnet 333ª, conductor 332, segment 331, contact of relay 329, to +314, thus causing the selector magnet 333ª to select the first punch of the machine perforator to indicate "tone No. 1". The counter is standing in a count of "two", and circuit is made from −337, segment 346, brush 306ª, selector magnet 336ᵈ, conductor 332, segment 331, contact of relay 329, to +314, thus causing selector magnet 336ª to select the punch in position No. 4 to indicate a count of "two". The punch magnet 334 energizes from +314, contact of relay 329, segment 331, conductor 332, punch magnet 334, retardation coil 355, to −347, and causes "tone No. 1", with a count of "two" to be punched in tape S₇.

At segment 338 brush 331ᵇ causes relay 320 to pick up and lock up, thus starting the restoration of the counter and breaking the circuit through latch magnet 315ª so that the brush arm 311 will be rested at segment 312. As the counter approaches segment 307 pin 304 operates key 308, thus releasing relay 320 which brings the counter to rest on segment 307 and restores the negative connection to latch magnet 315ª. Accordingly, brush arm 311 again advances.

(c) *Three zones of "tone No. 2" in tape P₄*

The operation will proceed as before for two revolutions of the sequence switch. On the third revolution of the sequence switch transmitter 302 will be reading the last zone of "tone No. 2" while transmitter 301 will be reading the first zone of "tone No. 3" in tape P₄'. Hence, there will be a difference in reading and punching of tape S₇ will take place. The counter will be standing at a count of "three" when the punch occurs, and hence count selector magnet 333ᵉ will be energized, thus selecting the punch in position 5 to indicate a count of "three". The first two feeler fingers of transmitter 302 will be up and this will cause the selection of the punches in positions 1 and 2 to indicate "tone No. 2". The circuit for tone selector magnet 333ª is from −345, back contact of relay 336ᵉ, contact of relay 336ª, selector magnet 333ª, conductor 332, segment 331, contact relay 329, to +314. The circuit for selector magnet 333ᵇ is from −345, back contact of relay 336ᵈ, contact of relay 333ᵇ, selector magnet 333ᵇ, etc., as for magnet 333ª. The punch takes place and the counter is restored as before.

(d) *Four zones "tone No. 3" in tape P₄*

The action will proceed as before, the punch taking place on the fourth revolution of the sequence switch. Transmitter 302 will have the first three contacts up and the counter will be standing at a count of "four". With the first three contacts of transmitter 302 up selector magnets 333ª and 333ᵇ and 333ᶜ will be energized. Conductor 332 is made positive as before from +314, contact of relay 329, and segment 331. Relays 336ª, 336ᵇ, and 336ᶜ are operated and relay 336ᵈ and 336ᵉ are non-operated. Accordingly, selector magnets 333ª and 333ᶜ are energized from conductor 332 (now positive) contacts of relay 336ª and 336ᶜ, respectively, back contact of relay 336ᵉ, to −345. Selector magnet 336ᵇ is energized from conductor 332, contact of relay 336ᵇ, back contact of relay 336ᵈ to −345. Accordingly, when the punch takes place positions 1, 2, and 3 are punched to indicate "tone No. 3" and positions 4 and 5 are punched (the counter being at "four") to indicate a count of "four".

(d) *Two zones of "tone No. 4" in tape P₄*

When the punch takes place, selector magnet 333ᵈ will select the punch in position 4 for a count of "two", as previously explained. The first four feeler fingers of transmitter 302 will be up, hence relays 336ª to 336ᵈ will be operated, and relay 336ᵉ will be non-operated. The operation of relay 336ᵈ cuts off the connection from −345 to selector magnet 336ᵇ and hence of the tone selector magnets, only the magnets 333ª and 333ᶜ will be energized, thus causing holes to be punched in positions 1 and 3 to indicate "tone No. 4".

(e) *Five zones of tone No. 5 in tape P₄*

The action will proceed as before until with brush 311ᵇ on segment 325 the counter is advanced to a count of "four". As the counter moves into this position pin 305 closes key 310, thus completing a circuit from −323, relay 329, to +314, thus causing the operation of relay 329, which locks up as before. Accordingly the perforator will operate to perforate tape S₇ with "tone No. 5" and a count of "four". All five contacts of transmitter 302 are up and hence all of relays 336ª to 336ᵉ are operated. The operation of relay 336ᵉ cuts off the negative connection from −345 to selector magnets 333ª and 333ᶜ. The operation of relay 336ᵈ cuts off the negative connection from −345 to selector magnet 333ᵇ but this negative connection is restored through the front contact of relay 336ᵉ. Hence of the three tone selector magnets 333ᵇ alone will be energized to cause a single perforation to be punched in position 2 to denote "tone No. 5". Relay 329 being operated, brush 311ᵇ at segment 338 will initiate the restoration of the counter as before. There is one more zone of "tone No. 5" in tape P₄ and the apparatus will operate as previously described to record this in tape S₇ as "tone No. 5", with a count of "one".

Method of reconverting condensed record to primary record

The condensed records are telegraphically transmitted in a standard manner, thus producing replicas of the condensed records at the receiving end. These replicas of Figs. 2, 3, 4 and 6 may be reconverted into replicas of the appropriate primary record by methods which are the reverse of the condensing method used. If the reconversion is to be carried out manually, the operator notes the tone and count and punches in a primary record the tone indicated, repeating the tone punching until a series of like zones equal to the indicated count has been reached. However, by the employment of the elements forming the apparatus previously described in a different combination, as will be understood from the two portions into which the intermediate record has been divided a replica of the primary intermediate record may be formed, by which apparatus for producing a pictorial representation as described in our patents previously referred to may be controlled.

Automatic reconversion of condensed record to primary record

Equipment such as used in Fig. 10 may be connected to automatically reconvert any of the secondary records of Figs. 2, 3, 4, and 6 into the appropriate primary record. Since similar apparatus can be used for each of the specific reconversions, only the reconversion of the record of Fig. 2 to that of Fig. 1 will be described by way of example. Apparatus connected for this illustration of automatic reconversion is shown in Fig. 11, and it will be apparent that any of the other reconversions may be performed by similar apparatus operating in an analogous manner.

In Fig. 12, a tone tape $RS_5$ which is a replica of tape $S_5$ (Fig. 10), is fed through a transmitter $T_1$; and a corresponding count tape $RS_5'$ which is a replica of tape $S_5'$ is correspondingly fed through a second transmitter $T_2$. The tone combination read from tape $RS_5$ by transmitter T, is set up in a standard machine perforator such as previously referred to, and is punched in tape $RP_3$ as many times as is called for by the count read from the count tape $RS_5'$ by transmitter $T_2$. One such punch is made for each revolution of a sequence switch. Once in each revolution of the sequence switch, the counter is stepped forward one step and the count of the counter compared to the count being read by transmitter $T_2$. When the counter reaches the count being read by transmitter $T_2$, the repeated perforation of tape $RP_3$ is arrested and tapes $RS_5$ and $RS_5'$ are each advanced one step for the next tone and count, the counter being restored to starting position and the operation beginning anew.

The operation will be traced for the tones and counts shown on tapes $RS_5$ and $RS_5'$. Start with the system completely deenergized, brush $201^a$ on segment 202 brush $203^a$ on segment 204, and pin 205 holding key 200 open. Current is turned on and motor 1 (Fig. 1) rotates to advance brush arm 203 except when it is arrested by latch 211, and to advance counter brush arm 201 as permitted by escapement latches $218^a$ and $219^a$.

(a) *First zone of tapes $RS_5$ and $RS_5'$—"no tone", count "one".*

The tapes are manually fed into the transmitters so that transmitter $T_1$, is reading the first zone of tape $RS_5$ and transmitter $T_2$ is reading the first zone of tape $RS_5'$. Brush $203^a$ completes circuit from +207, segment 204, latch magnet 208, back contact of relay 209, to −210, thus withdrawing latch 211 and releasing brush arm 203. At segment 212, brush $203^a$ makes conductor 213 positive and hence the selector magnets $SM_1$ to $SM_5$ are energized in accordance with the connections made to bus 215 and −214 by transmitter contacts $C_1$ to $C_5$. In this case, there are no perforations in tape $RS_5$ and hence no connection is made to bus 215. The punch magnet PM is energized, however, from +207, segment 212, conductor 213, punch magnet PM, retardation coil 206 to −214; and a blank is punched in the first zone of tape $RP_3$. Since the punch magnet and the selector magnets are both energized from segment 212, the operation of the punch must be delayed until the selector magnets have selected the punches. The mechanical operation of the punch is a slow one and usually gives sufficient delay, but the punching operation may be further delayed by retardation coil 206.

At segment 216, brush $203^b$ completes circuit from −220, segment 216, escapement magnet 218, to +221, thus stepping the counter forward a half step and causing pin 205 to release key 200 so that it closes. At segment 217, brush $203^b$ completes circuit from −220, segment 217, escapement magnet 219 to +221, thus advancing the counter another half step to a count of "one".

The counter now reads "one" and transmitter $T_2$ is also reading "one". With this condition (like readings) no current flows to relay 224. Circuit is from +225, bus 222, contact $t_3$, slip ring 240, brush $201^c$, segment 241 and back to bus 222 which does not get to relay 224. For convenience in tracing circuits through the counter, all segments connected to bus 223 are diagonally lined, and all white segments (except the five slip rings) are connected to bus 222.

When brush $203^b$ reaches segment $226^a$, the reading of transmitter $T_2$ is compared to the reading of the counter. Relay 224 being non-operated, circuit is made from −227, segments 226ᵃ and 226ᵇ, transmitter magnets 229 and 230 (in parallel) to 231 and +225, respectively, thus advancing each of tapes RS₅ and RS₅' one step. Circuit is also made from −227, segments 226ᵃ and 226ᵇ, relay 209 and +228, thus operating relay 209 which locks up from −239 to +228. Operation of relay 209 completes parallel circuits from −210, through escapement magnets 218 and 219 to +221, thus withdrawing latches 218ᵃ and 219ᵃ which permits brush arm 201 to be continuously advanced to restore the counter. Operation of relay 209 also breaks the circuit from latch magnet 208 to −210 so that brush arm 203 will be arrested by latch 211.

As the counter brush 201ᵃ approaches segment 202, pin 205 opens key 200 and releases relay 209 in time to effect the release of latches 218ᵃ and 219ᵃ and arrest brush 201ᵃ on segment 202 with pin 205 holding key 200 open.

(b) *Second zone of tapes RS₅ and RS₅'—"tone No. 1", count "two"*

As soon as relay 209 releases, latch magnet 208 is energized (brush 203ᵃ being on segment 204) and brush arm 203 advances. At segment 212 brush 203ᵃ completes circuit as before to punch "tone No. 1" in the second zone of tape RP₃. At segments 216 and 217, brush 203ᵇ completes circuits to advance the counter to segment 233 for a count of "one". Contacts t₁ and t₃ are up, and circuit is made from +225, bus 222, contact t¹, slip ring 240ᵃ brush 201ᵃ, segment 233, bus 223, relay 224, to −234, thus operating relay 224. Accordingly, when brush 203ᵇ reaches segment 226ᵃ, segment 226ᵃ is dead and no circuits are made to advance tapes RS₅ and RS₅' or to operate relay 209 and restore the counter. Therefore, when brush 203ᵃ reaches segment 204, latch 211 is withdrawn and the brush continues to rotate.

At segment 212, brush 203ᵃ completes circuit to cause "tone No. 1" to again be punched in tape RP₃. At segments 216 and 217, the counter is advanced two half steps, bringing it to a count of "two". The count being read from tape RS₅' is also "two" and no current flows to relay 224. The circuit from +225 through contact t₁ leads to segment 243 and from there back to bus 222. Similarly, the circuit from +225 through contact t₃ leads to segment 241 and from there back to bus 222. Accordingly, relay 224 is non-operated; and at segment 226ᵃ, brush 203ᵇ makes circuits as before to advance tapes RS₅ and RS₅' and operate relay 209 to thereby restore the counter and cause the brush arm 203 to be arrested at segment 204 until the counter has been restored.

*Third and fourth zones of tapes RS₅ and RS₅'*

The third zone of tapes RS₅ and RS₅' is "tone No. 5", with a count of "one". The operation will be the same as for the first zone except that the marking on tape RP₃ will be "tone No. 5" instead of "no tone". The fourth zone of tapes RS₅ and RS₅' is the same as the first zone and hence the operation will be the same, "no tone" being marked once on tape RP₃.

(d) *Fifth and sixth zones of tapes RS₅ and RS₅'—"tone No. 3", count "thirty-two" and "one"*

The operation will proceed as before, but tapes RS₅ and RS₅' will stand still in the transmitters until the sequence switch is making its thirty-second revolution. At each revolution of the sequence switch "tone No. 3" will be punched in tape RP₃, and the counter will be advanced one step. At each step of the counter, its reading is compared (in effect at least) to the reading of transmitter T₂ when brush 203ᵇ is at segment 226ᵃ. Until the counter reaches thirty-two, there is a difference between the counter reading and the reading of transmitter T₂ and current flows to relay 224, so that it is kept operated and segment 226ᵃ is kept dead. When the counter reaches thirty-two no current flows to relay 224, so that segment 226ᵃ becomes live and tapes RS₅ and RS₅' are advanced to the sixth zone. This is also for "tone No. 3" with a count of one. Accordingly, this is punched in tape RP₃ making thirty-three consecutive zones of "tone No. 3."

*Counter of Fig. 13*

The counter shown in Figs. 10, 11 and 12 comprises five slip rings, with each of which there is associated a series of segments and a brush to make connection from the slip ring to the segments. It will be noted that in each case the brush and segments operate, either to alternately make and break connection between the slip ring and a common conductor, or to alternately switch connection of the slip ring from one common conductor to another common conductor. This switching can be performed by many types of apparatuses and in Fig. 13 there is shown a type of switching device which may be used in each of Figs. 10, 11, and 12. The toothed disks 7, Fig. 2, instead of driving a brush arm may drive a shaft carrying five cams 255ᵃ to 255ᵉ arranged to operate switching keys to perform the same switching operations that are performed by the segments and brushes in Figs. 10, 11, and 12. In Fig. 13 the cams are shown in developed form and operate keys 256ᵃ to 256ᵉ that perform the same circuit changes performed by the counter segments, etc., in Fig. 12. To substitute the form of counter shown in Fig. 13 for that shown in Fig. 12, it is merely necessary to break the connections in Fig. 12 at s, u, v, w, x, y, z, and make respective connection to the conductors $s'$, $u'$, $v'$, $w'$, $x'$, $y'$, and $z'$ in Fig. 13.

*Entire picture transmitting system—Fig. 14*

A picture or any suitable representation of the picture is operated upon by apparatus 361, which scans the picture and punches a primary intermediate record, e. g. a tape such as shown in Figs. 1 or 5. This apparatus may be of any suitable type known to the art such as the apparatus described in British and United States patents previously referred to or in our German Patent 438,835 of January 3rd, 1927. The primary record 362 is passed to apparatus 363 for condensing the record, i. e., for producing a secondary record such as shown in Figs. 2, 3, 4, or 6. Suitable apparatus for 363 is that of Figs. 10 and 11. The condensed or secondary record 364 is passed to a standard tape transmitter 365 which sends out electrical impulses over a signalling path 366 and thereby controls a standard machine perforator 367 to produce a replica 368 of the condensed record at the receiving station. Since record 364 is shorter than record 362, the tape transmitter should preferably not be set in operation until enough of record 364 has been completed to enable the tape transmitter to be continuously supplied with record 364 for the entire transmission.

The tape transmitter 365, signalling path 366, and the telegraphically operated machine perforator 367 are all well known in the art and are commercially employed by telegraph and cable companies. The replica 368 of the condensed or secondary record is fed into apparatus 369 for re-converting the secondary record to a replica of the primary record. Suitable apparatus for 369 is shown in Fig. 12. The replica 370 of the primary record is then operated upon by apparatus 371, which automatically translates the replica of the primary record into a replica of the original picture. Apparatus 371 may be of any suitable type known to the art, e. g. that shown in our United States, British and German patents previously referred to.

Where the secondary record is on two tapes such as shown in Fig. 2, it may be transmitted by successively transmitting the two tapes or by simultaneously transmitting the two tapes over separate signalling paths.

*Miscellaneous*

For convenience in tracing circuits in Figs. 10, 11, and 12, various points in the circuits have been marked positive and negative with identifying reference characters. It will be understood, however, that in actual practice a single source of current may ordinarily be used for operating a given apparatus. If more than one source of current is used or required in operating a given apparatus the sources must be so connected that all circuits will be completed, as is well understood in the art.

The present invention may be carried out in many ways and by means of many specific forms of apparatus. Accordingly, the present disclosure is merely illustrative in compliance with the patent statutes and not to be considered as limiting.

*Definition of terms*

In effect, the picture to be transmitted is scanned along a large number of lines of scanning and each line of scanning is divided into a multiplicity of elemental areas. The tone values of the elemental areas are individually determined during the scanning operation. By "determining" the tone value is meant that the tone value is made effective in some manner characteristic of the particular tone value. Whether or not an operator has the tone value impressed on his mind is immaterial. The picture may be scanned and the tone value determined in many ways known to the art and such expression as "scanning the picture" include operating upon the object or picture itself or any suitable representation of the picture such as (inter alia) a positive, negative, transparency, half tone plate, gum bichromate print, relief representation, or a plurality of any such representations.

Referring to Figs. 2, 3, 4, and 6, it will be seen that the character of the condensed record is similar in all cases, the record being on two tapes in Fig. 2, and on a single tape in Figs. 3, 4, and 6. In all of these figures, however, the record is on "tape material". In each of these condensed records it will be seen that the record is characterized by a plurality of zones arranged longitudinally of the tape material. The expression "longitudinally of the tape material" has no reference to the longitudinal and lateral dimensions of the zones, but merely to the fact that the zones follow one another as the record is progressed from end to end. Each of the zones shown in Figs. 2, 3, 4 and 6 corresponds either to an individual elemental area of the picture or to a group of successive elemental areas of like tone. For convenience, therefore, these zones may be called "picture zones" to distinguish from other zones that the record may contain for the purpose of starting and stopping signals or the like.

Each of the picture zones in the condensed record contains a marking denoting the tone value of the elemental picture areas (or area) and a count marking denoting the number of elemental picture areas in the group of areas represented by that zone. In Fig. 2, the tone markings and count markings are on separate tapes, and in this form of record a "picture zone" has two portions, one on the tone tape and the other on the count tape. In the specific form of the invention illustrated the tone and count is denoted by code perforations on the tape and for convenience this may be referred to as "tone perforations" where they denote tone, and "count perforations" where they denote count, to distinguish from other perforations which may be used as stopping and starting signals or the like.

It will be noted that the condensed records are characterized by group markings for recording the elemental areas of the pictures. Such expressions as a "group record" means that a group of elemental areas is recorded as a group (with tone and count) as distinguished from individual recording of the elemental areas making up the group. The tone of the group may be recorded by a single code marking, which is one or more perforations (or even the absence of perforations) which taken collectively denote the particular tone. Where an elemental area of the picture is so positioned that both the preceding and succeeding elemental areas of the picture differ in tone value, this may be said to be an "isolated" elemental area of the picture of a given tone. When this is recorded on the condensed tape the count is only one and hence the tone marking on the condensed tape may be said to be an "isolated" or "individual" tone marking, since it corresponds to only one elemental area of the picture.

Having thus described our invention, what we claim is:

1. The method of making a condensed non-pictorial record of a picture which comprises determining the tone value of elemental areas of the picture, selecting groups of elemental areas of like tone, and recording the tone of each selected group and the number of elemental areas constituting the group.

2. The method of making a condensed non-pictorial record of a picture which comprises scanning the picture to determine the tone value of the successive elemental areas of the picture, counting the number of elemental areas in groups of successive elemental areas of like tone, and recording the tone value of each group and the number of successive elemental areas constituting the group.

3. The method of making a condensed non-pictorial record of a picture which comprises scanning the picture to determine the tone value of the successive elemental areas of the picture; and recording the tone value of the elemental areas in the order in which they occur in the picture by individually recording isolated elemental areas of a given tone and recording as a group groups of successive elemental areas of like tone, each group record giving the tone of the group and the number of elemental areas constituting the group.

4. The method of making a condensed non-pictorial record of a picture which comprises determining the tone value of elemental areas of the picture; selecting groups of elemental areas of like tone; and punching group records of the tone value in telegraphic tape material, each group record comprising a single code marking denoting the tone value of the group and a single code marking denoting the number of elemental areas constituting the group.

5. The method of making a condensed non-pictorial record of a picture which comprises scanning the picture to determine the tone value of the successive elemental areas of the picture, counting the number of elemental areas in groups of successive elemental areas of like tone, and punching group records of the tone value in telegraphic tape material, each group record comprising a single code marking denoting the tone value of the group and a single code marking denoting the number of elemental areas constituting the group.

6. The method of making a condensed non-pictorial record of a picture which comprises scanning the picture to determine the tone value of the successive elemental areas of the picture; and recording the tone value of the elemental areas in the order in which they occur in the picture by punching in telegraphic tape material individual records of isolated elemental areas of a given tone and group records of groups of successive elemental areas of like tone, each group record comprising a single code marking denoting the tone value of the group and a single code marking denoting the number of elemental areas constituting the group.

7. The method of condensing a non-pictorial record of a picture having series of like markings which comprises counting the number of like markings in a series and recording the series as a group by giving the character of the markings of the series and the number of markings constituting the series.

8. The method of condensing a non-pictorial record of a picture having series of like markings and isolated markings which comprises recording the markings in the order in which they occur by individually recording the isolated markings, counting the number of like markings in a series, and recording the series as a group, the group record giving the character of the markings of the series and the number of markings constituting the series.

9. The method of converting into a primary record a condensed picture record having a group marking denoting both a group tone for a group of like elemental picture areas and the number of elemental areas constituting the group, which comprises determining the tone denoted and the number of elemental areas denoted, and successively recording the tone as many times as there are elemental areas in the group.

10. The method of converting into a primary record a condensed picture record having individual markings denoting the tone value of individual elemental picture areas and group markings denoting both the tone of groups of like elemental picture areas and the number of elemental areas in each group, which comprises determining the tone denoted for the individual elemental picture areas, individually recording such individual tones, determining the tone denoted and the number of elemental areas denoted in the group markings, and recording each group tone as many times as there are elemental areas in the group.

11. The method of converting into a primary record a condensed picture record having a group marking denoting both a group tone for a group of like elemental picture areas and the number of elemental areas constituting the group, which comprises determining the tone denoted and the number of elemental areas denoted, and successively characteristically perforating a tape as many times as there are elemental areas in the group.

12. The method of converting into a primary record a condensed picture record having individual markings denoting the tone value of individual elemental picture areas and group markings denoting both the tone of groups of like elemental picture areas and the number of elemental areas in each group, which comprises determining the tone denoted for the individual elemental picture areas, individually recording such individual tones by characteristically perforating a tape, determining the tone denoted and the number of elemental areas denoted in the group markings, and characteristically perforating the tape as many times as there are elemental areas in the group.

13. The method of transmitting a picture which comprises scanning the picture to determine the tone value of the successive elemental areas of the picture, making a condensed non-pictorial record by counting the number of elemental areas in groups of elemental areas of like tone, and recording the group tone and the count; and telegraphically transmitting the condensed record.

14. The method of transmitting a picture which comprises scanning the picture and making a primary intermediate record of the picture, converting the primary record into a condensed record, telegraphically transmitting the condensed record, reconverting the transmitted record into a second primary record, and translating the second primary record into a replica of the original picture.

15. The method of transmitting a picture which comprises scanning the picture to determine the tone value of the successive elemental areas of the picture, counting the number of elemental areas in groups of elemental areas of like tone, characteristically perforating a telegraphic tape to denote the tone of each group and the number of elemental areas in the group, telegraphically transmitting the tape, translating the transmitted tape into a record having a recording thereon corresponding to the tone value of each elemental area of said picture, and reproducing a replica of the original picture from said record.

16. The method of transmitting a picture which comprises scanning the picture and making a primary intermediate record of the tone values of the picture; making a condensed record by counting the number of markings in groups of like tone markings in the primary record, and characteristically perforating a telegraphic tape to denote the tone of the groups of like markings in the primary record and the number of markings in each group; telegraphically transmitting said tape; converting the transmitted tape into a second primary record; and translating the primary record into a replica of the original picture.

17. A non-pictorial representation of a picture comprising tape material having certain picture zones, each of which corresponds to a group of successive elemental picture areas of like tone, each of said picture zones having a tone marking and a count marking, the tone marking denoting the tone of the elemental picture areas represented and the count marking denoting the number of elemental areas in said group.

18. A non-pictorial representation of a picture comprising tape material having certain picture zones, each of which corresponds to a group of successive elemental picture areas of like tone, each of said picture zones having tone perforations and count perforations, the tone perforations denoting the tone value of the elemental picture areas represented and the count perforations denoting the number of elemntal areas in said group.

19. A non-pictorial representation of a picture comprising tape material having certain picture zones arranged longitudinally of the tape, each of said picture zones corresponding to a group of successive elemental picture areas of like tone, said zones having rows of tone perforations and row of count perforations extending generally transversely of the tape, the tone perforations in any zone denoting the tone value of the elemental picture areas represented by that zone and the count perforations denoting the number of elemental areas in said group.

20. A non-pictorial representation of a picture comprising standard telegraphic tape material adapted to operate standard telegraphic sending machines, the material having certain picture zones arranged longitudinally of the tape, each of said picture zones corresponding to a group of equal size elemental picture areas of like tone, and the zones having denoted thereon the tone values of the elemental picture areas in said group and the number of elemental areas in said group.

21. A non-pictorial representation of a picture comprising tape material having a code tone marking denoting the tone value of a group of successive elemental picture areas of like tone and a count marking denoting the number of elemental areas in said group.

22. A non-pictorial representation of a picture comprising tape material having a set of tone perforations denoting the tone value of a group of successive elemental picture areas of like tone, and a set of count perforations denoting the number of elemental picture areas in said group.

23. A non-pictorial representation of a picture comprising tape material having at least one marking denoting the tone value of a group of like tone elemental areas of a picture, and a count marking denoting the number of elemental areas in said group.

24. In a picture transmitting system, means to scan a picture and determine the tone value of the successive elemental areas of the picture, means to count the elemental areas in groups of elemental areas of like tone, and means to make a record of the tone and count for groups of elemental areas of like tone.

25. In a picture transmitting system, means to scan a picture and determine the tone value of the successive elemental areas of the picture, means to count the elemental areas in groups of elemental areas of like tone, and means to perforate a telegraphic tape to record thereon the tone and count for groups of elemental areas of like tone.

26. In a picture transmitting system, means to scan a picture and determine the tone value of the successive elemental areas of the picture, means to count the elemental areas in groups of elemental areas of like tone, means to perforate a telegraphic tape to record thereon the tone and the count for groups of elemental areas of like tone and to individually record thereon isolated elemental areas of a given tone, a signalling path, a machine perforator operable by impulses passing over said signalling path, means controlled by said tape to automatically send impulses over said signalling path to perforate a replica of said tape, means to translate the replica of said tape into a record having a recording thereon corresponding to the tone value of each elemental area of the said picture, and means to produce a replica of the original picture from the said record.

27. In a picture transmitting system, means to scan a picture and determine the tone value of the successive elemental areas of the picture, means to count the elemental areas in groups of elemental areas of like tone, means to perforate a telegraphic tape to record thereon the tone and count for groups of elemental areas of like tone and to individually record thereon isolated elemental areas of a given tone, a signalling path, means controlled by said tape to automatically send impulses over said signalling path, means to translate said impulses into a record having a recording thereon corresponding to the tone value of each elemental area of said picture, and means to produce a replica of said picture from said record.

28. The process of telautography comprising analyzing the representation to be transmitted into small areas, producing one record representative of the tone values of successive small areas, and producing another record of the number of times each tone occurs in succession.

29. The process of telautography comprising analyzing a representation to be transmitted into small areas, punching a code in a tape to represent the tone values of the successive small areas, punching another record in a tape to represent the number of elemental areas in succession having the same tone value.

30. The process of telautography comprising analyzing a representation to be transmitted into small areas, punching a code in a tape to indicate the tone values of the successive small areas, punching another record in a tape to indicate when the tone changes.

31. The process of telautography comprising analyzing the representation to be transmitted into small areas, punching a code in a tape to represent tone values of the successive small areas, punching another record in the same tape to represent the number of consecutive areas in each group having the same tone value.

32. Apparatus for use in the process of telautography or phototelegraphy, comprising means actuated to record change of tone of successive small areas of a representation to be transmitted and means adapted to count and record the number of said small areas occurring in succession between each change of tone.

33. Apparatus for use in the process of telautography or phototelegraphy as claimed in claim 32, in which means are provided interconnecting the means for recording the different tones of the small areas and counting means recording the number of times such tones occur in succession between each change of tone whereby the operation of said counting means is interrupted, the record of the total made, the counting means set to the initial position and the counting operation restarted at each change of tone.

34. In a picture transmitting system, means to explore successive elements of the picture and to automatically punch code combinations in a tape corresponding both to the number of elements in a sequence of like shade and the shade of said sequence, and means for varying said code combinations in accordance with the number of elements in a sequence.

35. In combination, an object comprising series of elemental areas, each series exhibiting shades of the same or of different intensities, means for testing the shades of the elements of a series, means to count the number of elements in a series of the same shade, and means to record the results of said count, said record varying in accordance with said count and the degree of shade of the counted elements.

36. In combination an object comprising elemental areas exhibiting series of shades which may be of the same or of different intensities, means to test and count the shades in a sequence of like intensity, and means to record, when the sequence changes, the intensity of the shade and the number of elements in the sequence.

37. Means to set up successive code combinations in a set of relays corresponding to the shade of successive elements of a picture, means to set up a code combination in relays at least one of which is not comprised in said set, this last mentioned combination corresponding to the completion of a cycle of elements in the picture, and means to record and effect the said combinations respectively.

38. Means to automatically transmit electrical currents corresponding to the degrees of light and shade in a succession of picture elements, and means to send a modified current for a succession of elements of like shade and thereby economize the time of transmission.

39. Means to punch a tape with symbols corresponding to the degrees of light and shade in a succession of picture elements, and means to punch in said tape a single code symbol for a succession of picture elements of like shade whereby the length of the tape is shortened for repeated picture elements of like shade.

40. Means to automatically transmit electrical currents corresponding to the degrees of light and shade in a succession of picture elements, means to count a succession of picture elements of like shade, and means to transmit a current of special character corresponding to the result of such a count, said special current indicating the degree of shade of the counted elements and their number.

41. Means to prepare a perforated tape for the transmission of a picture, comprising means to punch a distinctive set of holes in the tape corresponding to distinguishable shades in the respective picture elements, means to count a definite number of like shaded picture elements in succession, and means to punch a distinctive set of holes in the tape upon the completion of such a count.

42. Means to prepare a perforated tape for the transmission of a picture comprising means to punch a distinctive set of holes in the tape corresponding to distinguishable shades in the respective picture elements, means to count a definite number of like shaded picture elements in succession, means to punch a distinctive set of holes in the tape upon the completion of such a count and means to release the counting mechanism and restore it to initial condition when the shade changes short of the completed count.

43. Means to explore a picture element by element for the degrees of shade thereof, a plurality of devices adapted to respond respectively for the different degrees of shade, and means controlled by said devices, to record code combinations for the respective degrees of shade, said last mentioned means being adapted to make a single record indicating the number and shade of the elements in the sequence.

44. The method of electrically transmitting a picture which consists in automatically sending electric currents corresponding to successive picture elements and sending special modified currents for a sequence of picture elements of like shade and thereby economizing the time of transmission.

45. The method of electrically transmitting a picture which consists in automatically sending code combinations corresponding to the degree of shade of successive picture elements, automatically counting a sequence of picture elements of like shade, and sending a special code on the completion of such count, said special code indicating the shade and number of the counted elements.

46. The method of electrically transmitting a picture which consists in automatically sending code impulses corresponding to the degree of light and shade in successive picture elements, automatically counting a definite sequence of picture elements of like shade and sending a special code combination for such sequence instead of successive like impulses for the elements thereof.

47. In a picture transmission system, means for exploring successive elements of a picture to be transmitted, means for automatically making a single abbreviated code record of the number of elements in a sequence of like shade and of the degree of said shade.

48. In a picture transmission system, means for exploring successive elements of a picture to be transmitted, means for counting the number of elements in a sequence of like shade, and means for automatically making a record in the form of a single code combination of the number of counted elements and their degree of shade.

49. The method of reproducing the replica of an original picture from a received condensed telegraphic tape comprising a record of elemental tone values of the original picture and the number of like tone values in succession, which method comprises translating the condensed received telegraphic tape into a non-pictorial record having a recording thereon corresponding to each tone value of an elemental area of the said original picture, and reproducing a replica of the original picture from said record.

50. In a picture receiving apparatus, means to receive telegraphic signals and to produce therefrom a condensed tape having thereon a recording comprising representations of tone values of an original picture and the number of like tone values in succession, means to translate said condensed tape into a non-pictorial record having thereon a recording corresponding to the tone value of each elemental area of said original picture, and means to produce a replica of the original picture from said record.

HARRY GUY BARTHOLOMEW.
MAYNARD LESLIE DEEDES McFARLANE.